J. H. GILBERT
Inventor

By *[signature]*
Attorney

March 4, 1969   J. H. GILBERT   3,431,164
FOAMED POLYVINYLAROMATIC RESIN PRODUCTS HAVING ELONGATED
CELLS AT RIGHT ANGLES TO A SURFACE SKIN
AND THEIR MANUFACTURE Filed June 1, 1965   Sheet 2 of 2

J. H. GILBERT
Inventor

By *W. F. Mufatti*
Attorney

United States Patent Office 3,431,164
Patented Mar. 4, 1969

3,431,164
FOAMED POLYVINYLAROMATIC RESIN PRODUCTS HAVING ELONGATED CELLS AT RIGHT ANGLES TO A SURFACE SKIN AND THEIR MANUFACTURE
John Harold Gilbert, Chepstow, England, assignor to Monsanto Chemicals Limited, London, England, a British company
Filed June 1, 1965, Ser. No. 460,215
Claims priority, application Great Britain, June 2, 1964, 22,745/64
U.S. Cl. 161—161
Int. Cl. B32b 3/12, 27/30
26 Claims

ABSTRACT OF THE DISCLOSURE

Foamed polyvinylaromatic resin products comprising a mass of substantially parallel elongated cells oriented at right angles to an enclosing surface skin; processes for making such products by extruding a foamable composition through a die orifice into a zone of lower pressure defined by stationary surfaces which are spaced gradually further apart from each other along the direction of extrusion and which are cooled sufficiently to solidify the resin in contact with them and thus create a frictional drag; and dies suitable for use in such processes.

---

This invention relates to foamed resins, and in particular to a new extruded foamed resin, to a new process for extrusion, and to a new extrusion die.

Foamed thermoplastic resins such as for example foamed polystyrene are useful industrial products because of their excellent heat-insulating and other properties. They are often made by moulding, but they can also in some instances be produced by extrusion processes, and these are convenient in certain respects. Nonetheless there are difficulties associated with the consistent production of for example a foamed board or block of good quality by extrusion. There is for example in the formation of an extruded sheet of foamed polystyrene a tendency for warping and wrinkling to occur.

There has however now been discovered an extruded foamed resin of a new kind and having an excellent surface finish.

The new foamed product of the invention is an extruded foamed polyvinylaromatic resin comprising a mass of substantially parallel elongated cells enclosed by a surface skin, the elongated cells being orientated substantially at right angles to the surface skin.

The elongated cells have in most instances a ratio of length to width of between 1.5 and 10.

The surface skin of the foamed product is in a foamed condition, but it is foamed to a considerably less extent (that is to say it has a higher density) than the main inner mass of the foamed product. The surface skin normally is orientated in the direction of extrusion, and it is in many instances of a fibrous nature; moreover very often the skin has the property of being "peelable" from the mass of elongated cells that make up the rest of the extruded foamed product. Because of the disposition of the cells in relation to the orientated surface skin the foamed product can be cleaved more easily along a plane running parallel to the direction of extrusion and at right angles to the surface skin. In general there is a density drop across the mass of elongated cells, with the density being lowest at the centre and increasing in an outwards direction, and there is a zone immediately adjacent to the surface skin which has a density considerably higher than that of the density of the extruded product as a whole.

The cells are as has been stated elongated ones, and very often the ratio of length to width lies between 2 and 10, for example between 3 and 8. An average figure is sometimes about 5. The width of a cell is the average width at the mid-point of the cell in a plane at right angles to the longer axis; normally the cells are of substantially circular cross-section and their width is then the diameter, but the cells can be for example of elliptical or hexagonal cross-section. The width of the cells can vary between 0.001 and 0.05 inch, for example they can be in the range of 0.002 to 0.02 inch, such as about 0.01 inch.

An indication of the structure and appearance of the foamed product of the invention is given by way of example in the attached drawing, in FIGURES 7 and 8. FIGURE 7 shows in a cross-section the highly orientated elongated cells at right angles to the surface of a piece of extruded foamed polystyrene; the "skin" is orientated in the direction of extrusion.

The process of the invention is one for the production of an extruded foamed resin, in which a foamable polyvinylaromatic resin composition is extruded through a die orifice into a zone of lower pressure defined by stationary surfaces that are cooled so as to solidify the resin in contact with them and are spaced progressively further apart from each other along the direction of extrusion such that foaming of the resin occurs as it moves through the zone and there is produced a foamed product having a mass of substantially parallel elongated cells enclosed by a surface skin, the elongated cells being orientated substantially at right angles to the surface skin.

Also part of the invention is a die suitable for the extrusion of a foamed thermoplastic resin, having a die orifice communicating with a zone defined by stationary surfaces that are equipped with means for cooling them and are spaced progressively further apart from each other along the direction of extrusion.

The polyvinylaromatic resin is a polymer or copolymer of a vinylaromatic monomer, such as styrene, a chlorostyrene, vinyltoluene or α-methylstyrene. A copolymer can be one of a vinylaromatic monomer with another olefinic monomer, for example acrylonitrile, vinyl chloride, vinyl acetate, methyl acrylate, methyl methacrylate or ethyl acrylate. Toughened polystyrenes can be employed, for instance one that has been obtained by modification before or after polymerisation with a natural or synthetic rubber. Excellent results have been obtained using polystyrene, and this is one of the preferred resins.

The overall density of the extruded product can vary between fairly wide limits, and it can be between 1 lb. per cubic foot or slightly less to 10 pounds per cubic foot or more. A density between 1 and 7 pounds per cubic foot, such as between 1.5 or 2 and 4 or 5 pounds per cubic foot is often very useful, particularly in the case of a foamed polystyrene product. As has been stated the foamed product has an exterior surface skin, and this is usually "peelable." This surface skin, which may be for example of the order of 0.005 inch thick, can have a density that is for instance from 5 to 10 times the average density of the inner mass of elongated cells. The latter have an average density that is often about 10% less than that of the overall density for the whole extruded product.

In the process of the invention there is employed a foamable resin composition, which requires the presence of a blowing agent. This is preferably a normally gaseous substance but it can be a volatile liquid. In many cases the blowing agent is one that is normally gaseous but which while under pressure before extrusion is present in the liquid state. Examples of volatile substances that can be used include lower aliphatic hydrocarbons, such as ethane, propane, a butane or butene, or a pentane or pentene; lower alkyl halides, such as methyl chloride, trichloromethane or 1,2-dichlorotetrafluoroethane; and inorganic gases such as carbon dioxide or nitrogen. The lower aliphatic hydrocarbons, especially a butane, or mixture of butanes, are preferred. The blowing agent can also be a chemical blowing agent, which can for example be a bicarbonate such as for example sodium bicarbonate or ammonium bicarbonate, or an organic nitrogen compound that yields nitrogen on heating, such as for example dinitrosopentamethylenediamine or barium azodicarboxylate. From 3 to 30%, especially 7 to 20%, by weight based on the weight of the resin is often a suitable proportion of blowing agent, and for example the use of from 7 to 15% by weight of butane in conjunction with polystyrene has given excellent results.

Preferably the foamable resin contains a nucleating agent, which assists in the formation of a large number of small cells. A wide range of nucleating agents can be employed, including finely divided inert solids such as for example silica or alumina, preferably in conjunction with zinc stearate, or small quantities of a substance that decomposes at the extrusion temperature to give a gas. An example of the latter class of nucleating agents is sodium bicarbonate, used if desired in conjunction with a weak acid such as for example tartaric acid or citric acid. A small proportion of the nucleating agent, for example up to 5% by weight of the resin is usually effective.

In general in the process for the production of the foamed product, expansion occurs as the foamable resin leaves the die-orifice, and accordingly the dimensions of the latter are less than the cross-section of the required product. For example in the instance of a slit die expansion takes place along both dimensions; for instance a board 10 inches wide might be obtained from a slit die of 5 inch width. By choice of a suitable die size an extruded product of the desired cross-section can be obtained. For example foamed board can be produced up to 4 feet or more in width, and with a thickness of up to perhaps 2 inches. In general the thickness can be between 0.1 inch and 2 inches or more; it can for example be between 0.5 inch and 1 inch.

In the die the actual die orifice can be one of the type conventionally used, for example a straight slit die orifice or an annular die orifice.

The surfaces defining the zone are equipped with means for cooling them. Water-cooling is often the most satisfactory means to employ and it can for instance be applied through channels within the surfaces. Normally the surfaces of this cooling zone lead off directly from the die orifice. It is desirable to prevent as far as possible the conduction of heat from the extruder to the cooled surfaces, and this can be achieved for example by use of a thermally insulating material or by arranging for the area of contact between the surfaces and the extruder to be as small as possible. The surfaces defining the zone are cooled so as to solidify the foamed resin in contact with them, and to cause a certain amount of "drag" as the resin is extruded. The temperature of the zone-defining surfaces used in a particular instance (that is to say the average temperature of the mass of metal) depends partly on the nature of the resin and any plasticising effect of the blowing agent, but very often a temperature of from 50 to 100° C. lower than the extrusion temperature can be used. For example when a foamed resin is being extruded at 140° C., it is usually suitable for the zone-defining surfaces to be cooled to between 45° C. and 80° C.

Extrusion dies according to the invention are exemplified (not to scale) in the accompanying drawings, in which.

Figure 1:
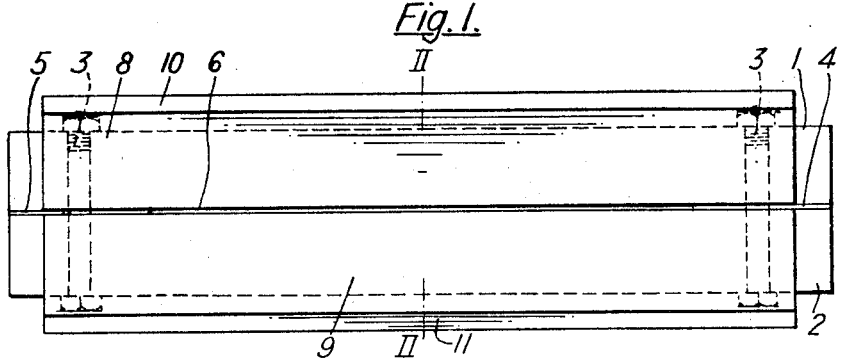
FIGURE 1 is a front elevation of a slit die.
Figure 2:
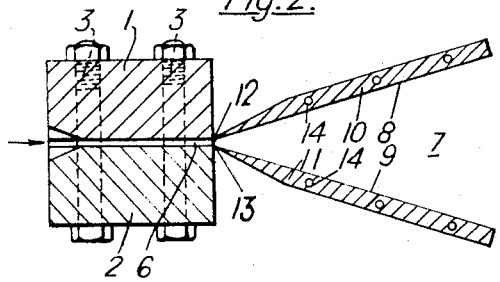
FIGURE 2 is a section along the line II—II in FIGURE 1.

The die shown in FIGURES 1 and 2 comprises two mild steel blocks 1 and 2 held together by four bolts 3 and having a pair of shim steel spacers 4 and 5, 0.035 inch thick, between them so that there is formed a slit orifice 6 0.035 inch wide, 5 inches long and having a land of 1 inch. The slit communicates with a zone 7 defined by the surfaces 8 and 9 of two mild steel plates 10 and 11 each 8 inches by 2 inches by ½ inch thick. The plates have knife edges 12 and 13 in contact with the outer faces of the blocks 1 and 2 and have adjustable clamp mountings (not shown) by means of which they can be set at various angles to each other as desired. A series of water-cooling channels 14 is drilled through each plate as shown. The die has means (not shown) for attaching it to the front end of the extruder, so that when the die is in use a foamable resin such as for instance foamable polysyrene is fed into the slit in the direction of the arrow and thence through the zone into the atmosphere.

Figure 4:
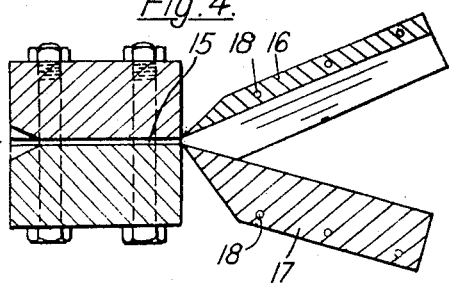
FIGURE 4 is a section along the line IV—IV in FIGURE 3.
Figure 3:
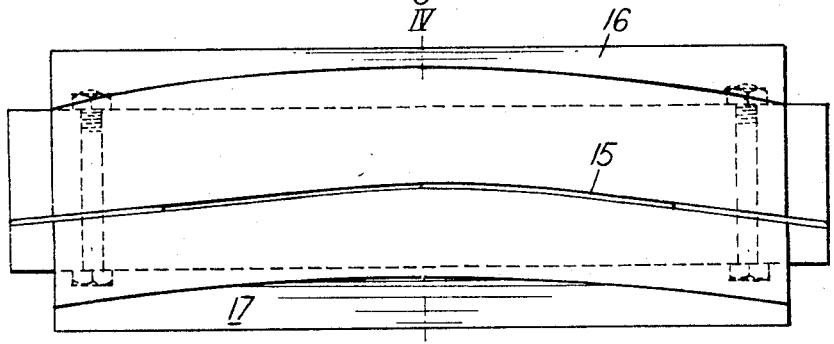
FIGURE 3 is a front elevation of a die for producing a curved section.

In the die shown in FIGURES 3 and 4 there is a curved slit 15, and the plates 16 and 17 have convex and concave surfaces respectively so that a foamed resin can be produced having a curved cross-section. The plates are equipped with water-cooling channels 18.

Figure 5:
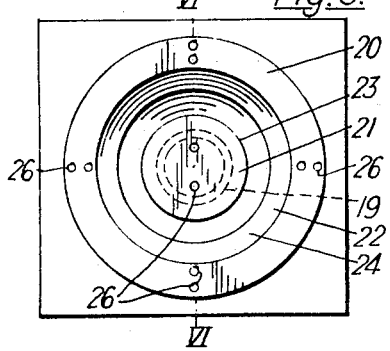
FIGURE 5 is a front elevation of a die for producing a tube of foamed material.
Figure 6:
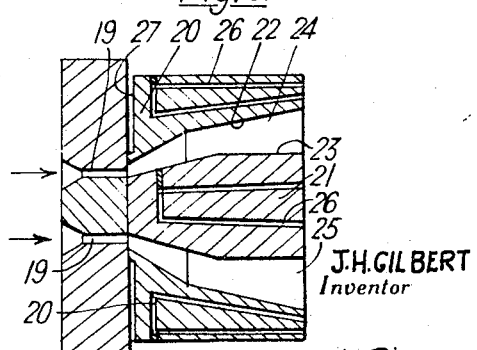
FIGURE 6 is a section along the line VI—VI in FIGURE 5.
Figure 7:
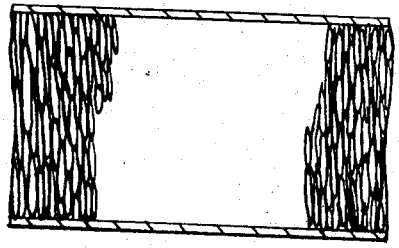
Figure 8:
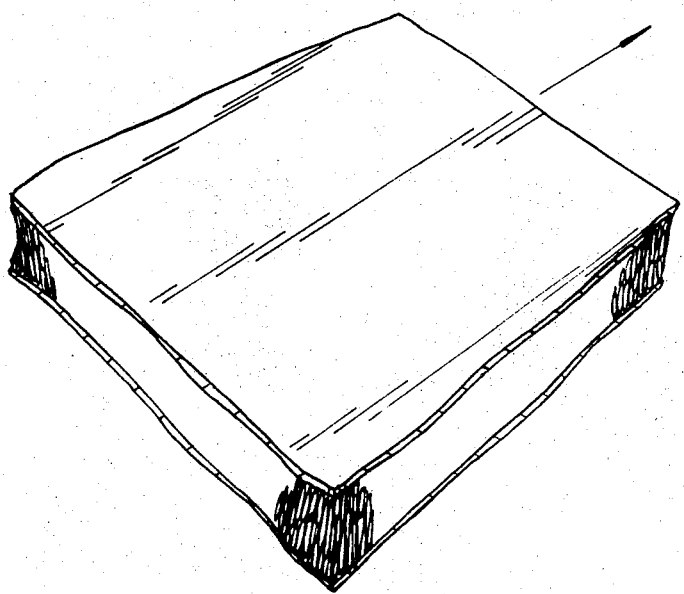

FIGURES 5 and 6 show a die suitable for the production of a tube of foamed resin. The die comprises an annular die orifice 19 having a diameter of 0.5 inch, a width of 0.04 inch and a land of 0.5 inch. Two mild steel blocks 20 and 21 are turned to the shapes shown and mounted one within the other so that their inner and outer surfaces 22 and 23 respectively define a zone 24 communicating with the die orifice 19. The mouth 25 of the zone is 1.5 inches away from the outer lip of the orifice 19, and the cross sections of the surfaces 22 and 23 at the mouth are 2 inches and 1 inch in diameter respectively. The blocks 20 and 21 are provided with water-cooling channels 26, and the outer block 20 has the face 27 that abuts on the die orifice partly cut away so as to minimise heat transfer to the block from the extruder.

In general the zone-defining surfaces can be plane or curved, depending on the shape of the final extruded section. For example, where a board is to be produced, the zone is preferably defined by two plane surfaces inclined to each other at an angle of between 15 and 60°, preferably between 20 and 40°, for instance about 30°; such a construction has been found to be particularly useful. On the other hand, curved extruded sections such as are useful for ceiling coving or pipe insulation for example can be produced using a zone defined by appropriately curved surfaces (which in the latter instance would in fact be continuous). Further, annular sections or tubes can be produced, and here the zone can be defined by two substantially conical surfaces (one within the other).

The extrusion temperature (that is the temperature of the unfoamed resin at the die orifice) depends to some extent on the softening point of the resin, but in general temperatures between 95° C. and 180° C., preferably between 100° C. and 160° C., are suitable. For example, when foamable polystyrene is being extruded a temperature in the range of 130° C. to 160° C. can often be used, particularly about 140° C.

The pressure within the extruder is sufficient to prevent the resin foaming until it leaves the die orifice and enters the zone of lower pressure. A pressure for example greater than 250 pounds per square inch, and especially between 250 and 5000 pounds per square inch can be employed. Preferably the pressure is between 300 and 1000 pounds per square inch. The presence within the cooling zone is lower than the extrusion pressure. It is not uniform through the zone, but decreases along the direction of extrusion. Near the die orifice it can for example be up to 100 pounds per square inch, but is usually much lower than this, for example between 10 and 20 pounds per square inch.

The foamed resin and process of the invention are illustrated by the following examples.

*Example 1*

This example describes a new foamed polystyrene product and its production by a process according to the invention.

Foamable polystyrene pellets containing 1% by weight of finely divided silica, 1% by weight of zinc stearate and 10% by weight of butane were extruded at a pressure of 500 pounds per square inch and a temperature of 140° C. through the slit die described above and illustrated in FIGURES 1 and 2, at a flow rate of 15 pounds per hour. The plates 10 and 11 were clamped so that the included angle between the surfaces 8 and 9 was 30°. The temperature of the plates was maintained at 50° C. by circulating cooling water in the channels 14.

There was produced a board of foamed polystyrene 10 inches wide and about ½ inch thick, having an overall average density of 1¾ pounds per cubic foot. It was of good strength in both the transverse and longitudinal directions, and the surface finish was excellent. A "peelable" skin of fibrous foamed polystyrene was present, orientated in the direction of extrusion. Expansion was found to have taken place predominantly at right angles to the direction of extrusion of the board, and the cells of the core were elongated, having an average effective diameter of 0.01 inch and average length 0.08 inch.

*Example 2*

This example describes a new foamed polystyrene extruded in the form of a tube and its production by a process according to the invention.

The foamable polystyrene composition described in Example 1 was extruded at a pressure of 500 pounds per square inch and a temperature of 140° C. through the die described above and illustrated in FIGURES 5 and 6, at a flow rate of 10 pounds per hour. The temperature of the blocks 20 and 21 was maintained at 70° C. by circulating cooling water in the channels 26.

There was produced a tube of foamed polystyrene of outside diameter 2 to 2.25 inches and inside diameter 1 to 1.12 inches and with excellent interior and exterior surface finish. The overall average density was 2 pounds per cubic foot, and a surface skin on the inside and outside of the tube was 0.005 inch thick and of density 10 pounds per square inch. The cells of the core were elongated along the radii of the tube, having an average effective diameter of 0.015 inch and an average length (measured along the radii of the tube) of 0.1 inch.

What I claim is:

1. A foamed polyvinylaromatic resin product comprising a mass of substantially parallel elongated cells having an orientation substantially at right angles to an enclosing integral surface skin, the density of said mass of elongated cells being lowest at the center and increasing in an outward direction.

2. The product of claim 1 wherein the polyvinylaromatic resin is polystyrene.

3. The product of claim 1 wherein the surface skin has a fibrous nature and an orientation perpendicular to the orientation of said elongated cells.

4. The product of claim 1 wherein the surface skin is peelable from the rest of the product.

5. The product of claim 1 wherein there is a centerward density drop across the mass of elongated cells.

6. The product of claim 1 wherein the zone immediately adjacent to the surface skin has a density considerably higher than that of the product as a whole.

7. The product of claim 1 wherein the overall density is 1–7 pounds per cubic foot.

8. The product of claim 1 wherein the cells have a length/width ratio of 3–8/1.

9. The product of claim 1 wherein the cells have a width of 0.002–0.02 inch.

10. A foamed polystyrene board comprising a mass of substantially parallel elongated cells having a width of 0.002–0.02 inch, a length/width ratio of 3–8/1, and an orientation substantially at right angles to the orientation of an enclosing surface skin; said board exhibiting a centerward density drop across the mass of elongated cells such that the zone immediately adjacent to the surface skin has a density considerably higher than the density of the board as a whole.

11. A process which comprises extruding a foamable polyvinylaromatic resin composition through a die orifice into a zone of lower pressure defined by stationary surfaces which are spaced gradually further apart from each other along the direction of extrusion such that foaming of the resin occurs as it moves through the zone and which are maintained at a temperature 50–100° lower than the extrusion temperature to solidify the resin in contact with them and thus create a frictional drag as the resin moves through the zone.

12. The process of claim 11 wherein the extrusion temperature is 100–160° C.

13. The process of claim 11 wherein the pressure within the extruder is 300–1000 pounds per square inch.

14. The process of claim 11 wherein the polyvinylaromatic resin is polystyrene.

15. The process of claim 11 wherein the foamable composition contains a blowing agent which is a normally gaseous substance or a volatile liquid.

16. The process of claim 15 wherein the blowing agent is a lower aliphatic hydrocarbon.

17. The process of claim 16 wherein the hydrocarbon is butane.

18. The process of claim 11 wherein the foamable composition contains a nucleating agent.

19. The process of claim 18 wherein the nucleating agent comprises silica.

20. A process which comprises extruding a foamable polystyrene composition containing a blowing agent and a nucleating agent at a temperature of 100–160° C. through a straight slit die orifice into a zone of lower pressure defined by two stationary plane surfaces inclined to each other at an angle of 20°–40° such that they are spaced gradually further apart from each other along the direction of extrusion to permit foaming of the polystyrene as it moves through the zone; said stationary plane surfaces being maintained at a temperature 50–100° lower than the extrusion temperature to solidify the polystyrene in contact with them and thus create a frictional drag as the polystyrene moves through the zone.

21. A die suitable for the extrusion of a foamable thermoplastic resin, said die having a die orifice communicating with a zone defined by stationary surfaces which are equipped with means for cooling them and which are spaced gradually further apart from each other along the direction of extrusion.

22. The die of claim 21 wherein the cooling means are water-cooling means.

23. The die of claim 21 provided with means for minimizing the conduction of heat from the extruder to the stationary surfaces.

24. A die suitable for the extrusion of a foamable thermoplastic resin, said die having a straight slit die orifice communicating with a zone defined by stationary surfaces which are equipped with means for cooling them and which are spaced gradually further apart from each other along the direction of extrusion.

25. The die of claim 24 wherein the surfaces defining the zone are two plane surfaces inclined to each other at an angle of 20°–40°.

26. A die suitable for the extrusion of a foamable thermoplastic resin, said die having a straight slit die orifice communicating with a zone defined by two stationary plane surfaces which are equipped with water-cooling means and which are inclined to each other at an angle of 20°–40° such that they are spaced gradually further apart from each other along the direction of extrusion; said die being provided with means for minimizing the conduction of heat from the extruder to the stationary plane surfaces.

References Cited

UNITED STATES PATENTS

| | | | |
|---|---|---|---|
| 2,537,977 | 1/1951 | Dulmage | 264—53 |
| 2,740,157 | 4/1956 | McCurdy et al. | 264—53 |
| 2,769,205 | 11/1956 | Pfleumer | 264—55 |
| 2,987,767 | 6/1961 | Berry et al. | 264—95 |
| 3,144,494 | 8/1964 | Gerow. | |
| 3,180,909 | 4/1965 | Looser. | |
| 3,249,486 | 5/1966 | Voisinet et al. | 264—54 XR |
| 3,290,198 | 12/1966 | Lux et al. | 264—51 XR |
| 3,144,492 | 8/1964 | Lightner et al. | 264—47 |
| 3,231,439 | 1/1966 | Voelker | 264—47 XR |
| 3,299,192 | 1/1967 | Lux | 264—48 |

FOREIGN PATENTS 225,024    10/1959    Australia.

PHILIP E. ANDERSON, *Primary Examiner.*

U.S. Cl. X.R.

18—5, 12, 14; 138—149; 264—48, 53